United States Patent [19]

Marwah et al.

[11] Patent Number: 5,639,346
[45] Date of Patent: Jun. 17, 1997

[54] MAGNETIC REMOVAL OF "STICKIES" FROM WASTE PAPERS

[75] Inventors: Nipun Marwah, Charleston; Allen A. Gold, Goose Creek, both of S.C.

[73] Assignee: Westvaco Corporation, New York, N.Y.

[21] Appl. No.: 447,240

[22] Filed: May 22, 1995

Related U.S. Application Data

[63] Continuation-in-part of Ser. No. 238,478, May 5, 1994, Pat. No. 5,527,426, which is a continuation-in-part of Ser. No. 183,746, Jan. 21, 1994, abandoned.

[51] Int. Cl.⁶ .................................................. D21C 5/02
[52] U.S. Cl. .................................................. 162/5; 162/55
[58] Field of Search ........................... 162/4, 5, 6, 55

[56] References Cited

U.S. PATENT DOCUMENTS 4,076,578  2/1978  Puddington et al. ................. 162/5
5,224,604  7/1993  Daczmal et al. ..................... 209/12

Primary Examiner—Brenda A. Lamb
Attorney, Agent, or Firm—Terry B. McDaniel; Daniel B. Reece, IV; Richard L. Schmalz

[57]  ABSTRACT

An improved process is disclosed for removing "stickies" from waste paper which contains hot-melt and pressure-sensitive adhesives and lattices to produce high quality (high brightness, little to no dirt content) pulp with little or no fiber loss. The process involves attachment of sticky particles in the waste paper pulp to a magnetic carrier material with the help of an agglomeration agent followed by removal of the attached sticky particles by magnetic separation. The magnetic treatment preferably is conducted at ambient or greater temperature, at neutral to alkaline pH, and at a low pulp consistency. Agglomeration and magnetite addition, followed by exposure of the repulped waste paper to a magnetic field provides near complete sticky removal over exposure to the magnetic field without such pre-treatment.

13 Claims, 3 Drawing Sheets

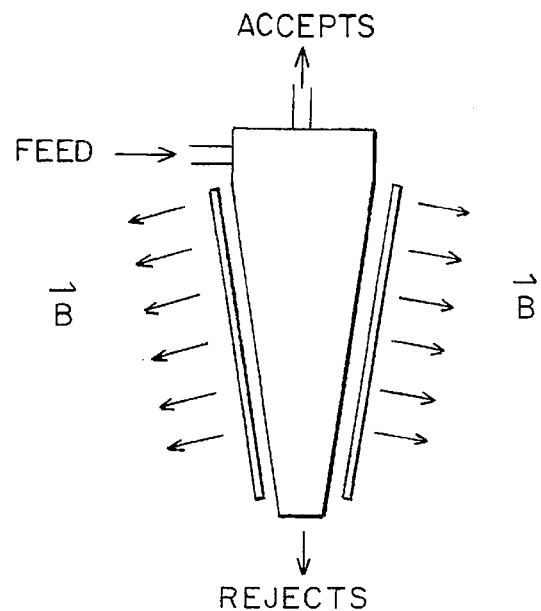
FIG. 2
FIG. 3
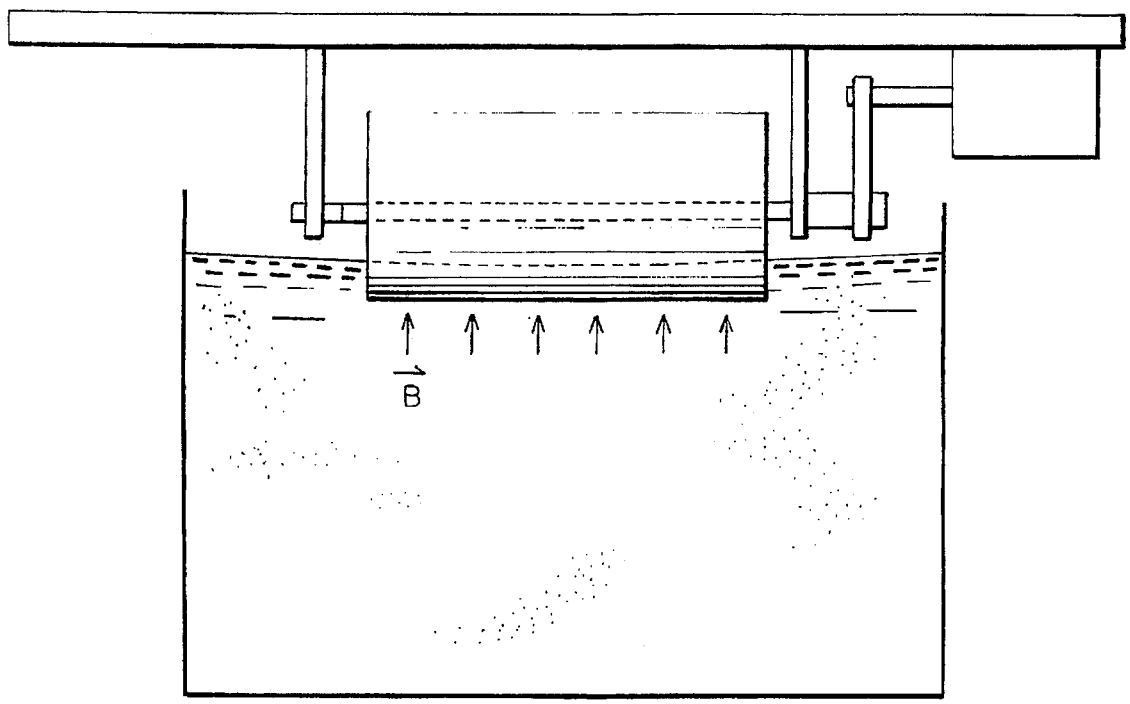

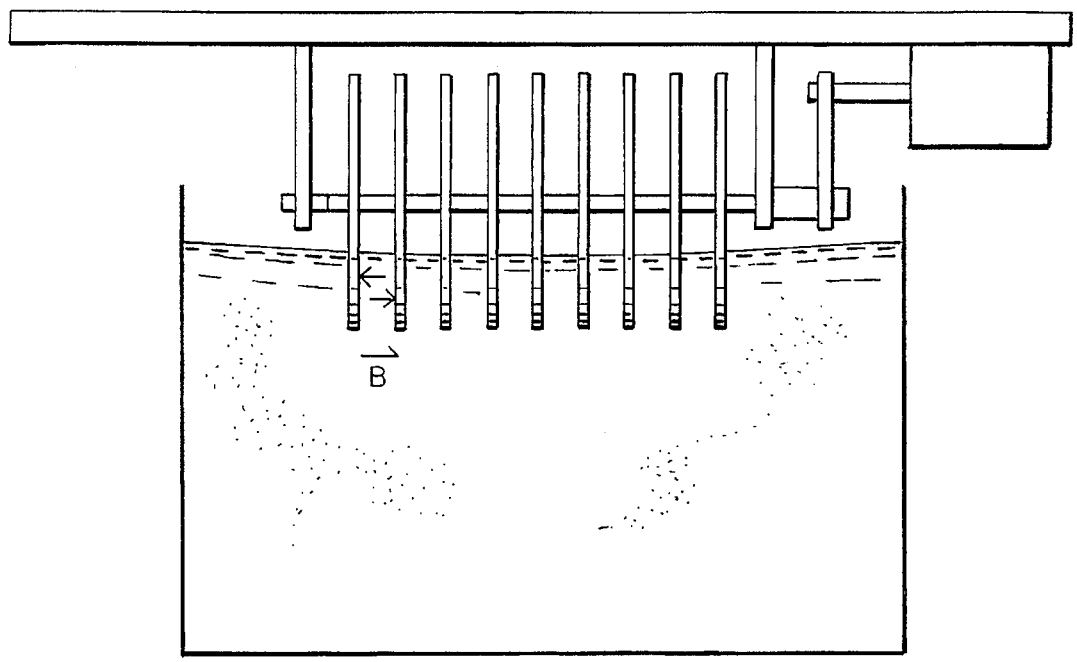
FIG.4
FIG.5
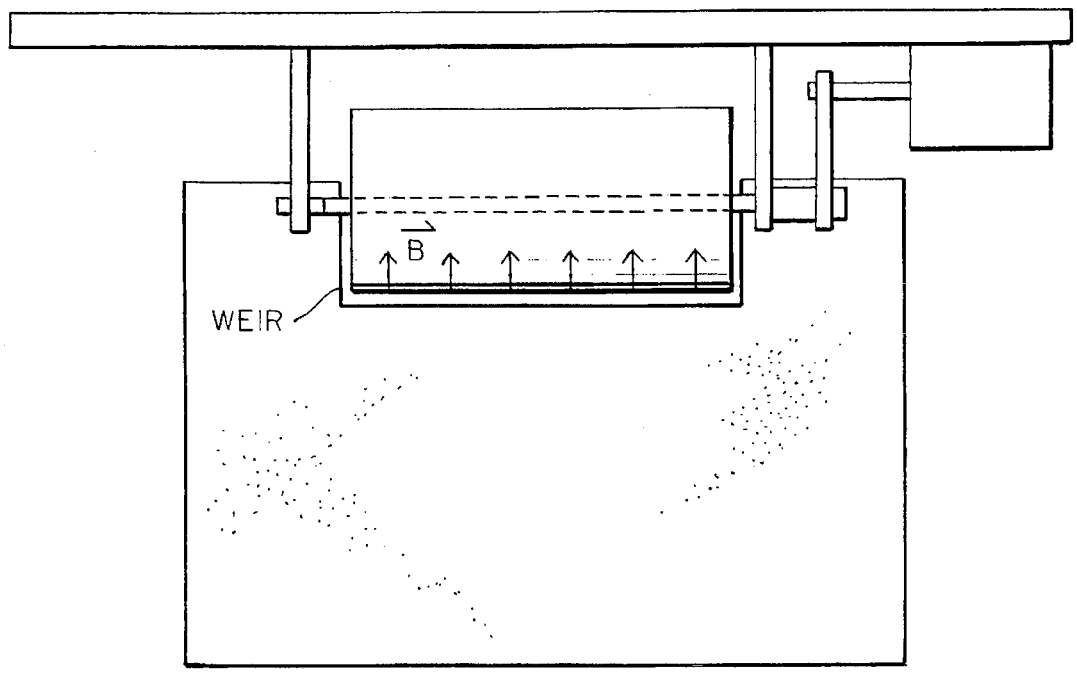

MAGNETIC REMOVAL OF "STICKIES" FROM WASTE PAPERS

This is a continuation-in-part application of application Ser. No. 08/238,478, filed May 5, 1994, now U.S. Pat. No. 5,527,426, which is a continuation-in-part of application Ser. No. 08/183,746, filed Jan. 21, 1994, now abandoned.

BACKGROUND OF THE INVENTION

1. Field of the Invention

The present invention relates to a method of removing sticky contaminants, such as hot melt and pressure-sensitive adhesives and lattices (referred to as "stickies"), from waste paper (secondary fiber). More particularly, this invention relates to removing stickies from secondary fibers contaminated therewith by introducing a magnetic promoter and subjecting a slurry of the fibers to a magnetic field.

2. Description of the Prior Art

Waste paper, also known as secondary fiber, has long served as a source of raw fiber material in papermaking. Waste paper materials invariably contain one or more contaminants including inks, dye colors, fluorescent whitening agents, and "stickies" (sticky or tacky contaminants including adhesives, binders, plastic films, coatings, and the like). Sorted waste paper has had most of these contaminated papers removed and represents a higher, more expensive grade of waste paper. The growing utilization of secondary fibers in many types of paper products, however, has made it necessary for paper manufacturers to process lower grades of waste paper (i.e., unsorted waste paper), which includes a significant volume of contaminated papers. While various methods have been employed to remove the contaminants to permit incorporation of the secondary fibers with virgin pulp in papermaking, such lower grade furnish is more heterogeneous and typically contains significantly more contaminants than a higher quality waste paper. Conventional treatment methods may not be adequate to permit incorporation of a significant percentage of unsorted waste papers.

Current approaches to processing recycled fibers can be classified as repulping (sluicing of fibers and partial detachment of contaminants from fibers), coarse and fine screening (separation of fibers from contaminants by size and shape), centrifugal cleaning (separation based on density differences relative to fibers and reduction in size of contaminants by mechanical action), flotation (separation by preferential adsorption of detached contaminants onto air bubbles), washing (separation of small entrained particles from fibers by relative flow of water passing by the fibers) and refining. There is an optimum particle size range for separation of particles from fibers in each of these processes. Depending upon the specific cleanliness requirements for the decontaminated pulp, it may take a combination of most or all of these processes to cover the size range of particles that one typically encounters. Both the washing and flotation processes depend on the proper use of surfactants. Depending on the relative strength and size of the hydrophilic versus hydrophobic portion of the surfactant molecule, the surfactant will cluster around ink and other contaminant particles, rendering the particles either hydrophilic (for washing) or more hydrophobic (for flotation). The opposing natures of washing surfactants and flotation surfactants can cause problems in combination flotation/washing systems.

Certain specific removal approaches have been disclosed for specific waste paper contaminants:

U.S. Pat. No. 5,211,809 discloses removing color from dyes from secondary pulps with non-chlorine based bleaching agents in treating sequences using oxygen with combinations of peroxide, ozone, and/or hydrosulfite at controlled pH conditions (less than 8 or greater than 10).

Also, published Japanese Patent Application No. HEI 3[1991]-199477 teaches a method of recycling used paper containing either fluorescent white paper or colored paper or both by introducing ozone into a dispersed slurry of said used paper.

The most common removal problem is with inks. Printing inks have been classified broadly as impact and nonimpact inks. Impact inks are used in conventional printing processes such as letterpress, flexography, and lithography. These inks are pressed or laid onto the paper but do not fuse with it. They generally consist of a pigment suspended in an oil-based alkaline aqueous medium. The paper industry has been successfully deinking papers containing impact inks for years using washing and/or flotation type systems. Also, U.S. Pat. No. 4,381,969 teaches bleaching waste paper containing encapsulated constituents such as inks by repulping the waste paper in the presence of an aqueous alkaline solution which contains a peroxide compound such as hydrogen peroxide.

Nonimpact inks, comprised of a pigment and a thermoplastic resin, are used in reprographic printing processes. The resin is a bonding agent which fuses the pigment to the sheet and to other pigment particles. The pigments employed in nonimpact inks can be categorized as either iron-based or non-iron based (e.g., carbon based). The resin polymers become cross-linked and resistant to chemical and mechanical action, making nonimpact printed papers difficult to deink by conventional deinking processes. Once detached from the fibers the toner ink particles tend toward a size which is larger than that which can be efficiently handled by flotation or washing and too small to be removed by cleaners and screens. A list of approaches disclose methods for removing both impact and non-impact (reprographic) type inks are set forth in the co-pending parent applications noted above, and such disclosure is incorporated herein by reference.

While waste paper contaminants such as inks, dyes, and whiteners present real problems in recycling, stickies present unique problems due to their non-magnetic character and to their different chemistry and physical properties (e.g., high tackiness) compared to both impact and non-impact inks, whether magnetic or non-magnetic. In paper recycling, sticky contaminants, such as hot melt adhesives, latex, pressure-sensitive adhesives, and wax, pose considerable problems to papermakers. When present in unacceptable amounts, stickies can cause problems with both paper machine operation and product quality. This problem has been addressed by the prior art.

For example, U.S. Pat. No. 5,213,661 teaches using oxygen to reduce the tackiness of stickies in secondary pulps and, optionally, using oxygen with alkali and/or detackification agents for optimum stickies control. U.S. Pat. No. 5,080,759 teaches introducing a water-soluble organotitanium compound into the water system of a papermaking process containing the secondary fiber to reduce the tackiness and adhesive properties of the stickies contaminants.

Interestingly, U.S. Pat. No. 4,176,054 teaches separating a binder adhesive from the remaining paper material in waste paper by providing a magnetic material in the binding adhesive composition at the time of the binding operation in preparing books, catalogues, directories, pamphlets, magazines and the like so that, upon subsequent recycling, the cut up pieces of the books and magazines can be subjected to a magnetic field. Thus, the patented process is also a manufacturing operation in addition to a recycling method, and the taught recycling method is dependent upon initial incorporation of magnetic material in the hot melt or other type of adhesive used in the manufacturing process.

In actual practice, stickies are controlled by: furnish selection (purchase of hand-sorted waste paper); improved pulping and deflaking; well-designed screening/cleaning systems and dispersion; and use of additives to detackify and/or stabilize stickies. These approaches, alone or in combination, either require additional modifications in the recycling equipment or use undesirable chemical additives to control the stickies. Furthermore, these methods are not foolproof in removing the sticky contaminants.

Therefore, the object of this invention is to provide a method of removing stickies from repulped waste papers of improved efficiency and economy which is applicable to all types of stickies contaminants.

SUMMARY OF THE INVENTION

The above stated object of the invention is achieved by (1) repulping waste paper which contains non-magnetic stickles contaminants, whether or not in the presence of inks or other potentially magnetic contaminant, (2) adding magnetite and agglomerant to the pulp slurry, and (3) subjecting the treated pulped waste paper at low pulp consistency to a magnetic field to remove the stickies therefrom. Preferably, after magnetite and agglomerant addition, caustic is added to the pulp slurry prior to application of the magnetic field. More preferably, the magnetic treatment is conducted at ambient or higher temperatures, at pulp consistencies up to about 4%, and at neutral to alkaline pH. The magnetite/agglomerant/caustic/magnetic field treatment of the repulped waste paper can be used alone or as an additional step in a conventional process for removing contaminants generally, such as inks, from printed papers, such as screening, flotation, centrifugal cleaning, washing, and sedimentation and/or decantation.

BRIEF DESCRIPTION OF THE DRAWINGS

FIG. 2 is a cross-section depiction of the application of a magnetic field externally to a forward cleaner in a paper pulp manufacturing process.

FIG. 3 is a cross-section depiction of the application of a magnetic field in a tank containing waste paper pulp slurry via a magnetic rotating drum partially submerged in said tank.

FIG. 4 is a cross-section depiction of the application of a magnetic field in a tank containing waste paper pulp slurry via a magnetic disk (in series) filter partially submerged in said tank.

FIG. 5 is a cross-section depiction of the application of a magnetic field in a tank containing waste paper pulp slurry via a magnetic rotating drum situated in a weir within said tank.

DESCRIPTION OF THE PREFERRED EMBODIMENT(S)

Figure 1:
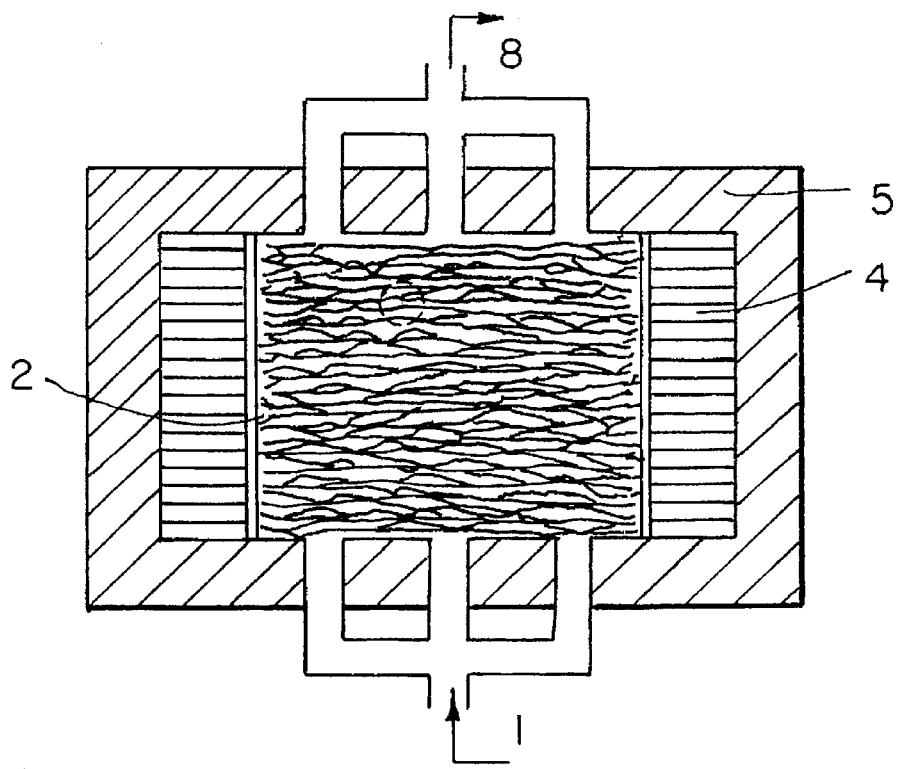
FIG. 1 is a cross-section depiction of the application of a high gradient magnetic separation technique for magnetic separation of contaminants.
Figure 1A:
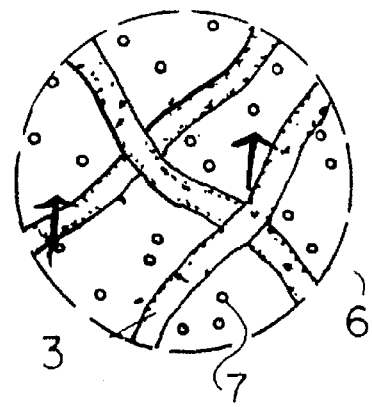
FIG. 1a is a magnified view of the internal (collector) portion of the high gradient magnetic separator depicted in FIG. 5.

The present invention provides a new and improved stickies removal method for waste paper which offers significant advantages over all other methods presently available. The major advantages of this new process over presently available systems are: high stickles removal efficiency; high fiber yield; low solid waste; compact process with low space requirements and low capital costs. Most importantly, the process produces extremely clean and bright reclaimed pulp for use in high grade products.

In the pulp and paper industry, pulp consistency (in water) is described generally as high (>15%), medium (7–15%), or low (<7%). Obviously, at medium and high consistency contaminant particle pathways toward a magnetic field may be blocked. Therefore, the invention method is preferably employed at low consistency. Also, the process achieves beneficial results under acid conditions above a pH of 4, although it is preferably employed at a neutral to alkaline pH. The preferred conditions for the magnetic treatment of the repulped mixed office waste is at from about 25° to about 65° C., at a pH of from about 7.0 to about 11.0 and at a pulp slurry consistency of from about 0.3 to 2.0%.

As magnetic separation is a physical rather than a chemical process and only particulate material is susceptible thereto, efficient stickies removal should involve a pretreatment to separate any fused or bound stickies particles from the repulped fibers, such as adsorption, coagulation/flocculation, and/or precipitation. Also, the particles to be magnetically separated must be attracted to the magnetic field of the magnet. Since stickies are not iron-based, in order to achieve near complete stickies removal by magnetic separation, this improved removal process involves addition of a magnetic carrier material for attachment to (and subsequent removal of) the non-iron based stickies particulates. Use of a magnetic carrier permits consistent high efficiency contaminant removal in waste papers without relying on the presence of xerographic and laser inks consisting of levels of iron-based inks.

When using a magnetic carrier material, it is essential that the binding forces between the particles to be removed and the carrier material exceed the hydrodynamic forces which are exerted on the particle by the fluid. The attachment strength of the binding forces depends on the components to be removed and is governed by colloidal and chemical forces. Auxiliary substances that enhance the attachment of the magnetic carrier to the stickies particles to be removed include surfactants or blends of surfactants with relatively low HLB values (HLB equals the ratio of weight percentages of hydrophilic to hydrophobic groups in the molecule), preferably ≦10. Suitable materials are those compounds whose molecules exhibit a long hydrophobic "tail" and a cloud point of above 65° C. Additional auxiliary substances may include montmorillonite, aluminum salts, ion exchangers, and polymers. In particular, a commercial agglomeration agent (or "agglomerant"), believed to be a blend of low HLB surfactants, is used in the examples to follow.

The addition of the agglomerant serves to modify the surface chemistry of the system such that the presumably large hydrophobic tail of the agglomerant migrates and attaches itself to the surface of each hydrophobic particle (sticky and magnetite) in the system. The resultant increase in attractive forces between particles promotes agglomeration. Also, the stickies particles become soft and tacky at temperatures from about 50° C. to about 85° C. which contributes to agglomeration. Then, on lowering the temperature to below about 40° C. by pulp dilution, the formed agglomerants become harder and more rigid; and as they contain some magnetic field susceptible material, they can be removed effectively by magnetic separation.

The invention process may involve less capital investment by interjecting the magnetic treatment at one or more of various treatment points in the conventional waste paper repulping process to enhance the effect of, or as a possible replacement for, such treatments. Examples of placements of the magnetic treatment are shown in the drawings.

While the invention process may employ magnetic separation via a permanent magnet or an electromagnet, high gradient magnetic separation (HGMS) technique should be effective for possible implementation of this new stickies removal method on a mill-scale. The HGMS is used commercially to remove ferromagnetic and paramagnetic contaminants from waste water, steam condensated, and koalin slurries. In most HGMS applications, a matrix of steel wool, wire grids, or other types of collectors made of magnetic material are provided. FIG. 1 shows, in cross-section, a cyclic type high gradient magnetic separator into which a wet slurry of material containing magnetic or paramagnetic impurities is fed through inlet port 1 and passed through the collector bed 2. The bed 2 is comprised of interwoven steel wires or steel wire mesh 3 to provide both openings through which the slurry can pass as well as a large surface area which is magnetized to a relatively high magnetic gradient or flux density by the electromagnetic coils 4 for attraction of magnetically suseptible materials within the slurry. The coils 4 and collector 2 are contained within an iron enclosure 5. FIG. 5a shows that as the slurry flows through the collector 2 the magnetic and paramagnetic contaminants 6 are attracted and collected while the remaining portion of the slurry 7 flows through the system and exits outlet port 8. After some time, the unit is flushed with the magnet de-energized, to remove the retained contaminants.

FIG. 2 shows the application of the invention method by applying a magnetic flux source (i.e., magnet) immediately external to a conventional conical forward cleaner, such that the flux, or magnetic field, is effective internal to the cleaner. The magnetic flux will provide an additional force on the contaminant particles pulling them toward the wall of the cleaner body. This action pulls additional contaminant particles into the reject stream, improving removal efficiency.

FIGS. 3 and 4, respectively, show a magnetic rotating drum or disk filter arrangement employed to attract magnetically susceptible contaminant particles from the upper portion of a tank of waste paper slurry. This approach would be appropriate any time after the contaminant particle is detached from the fiber. The magnetic particle removal equipment should be positioned to remove the particles which tend to concentrate in the vortex area of a stirred tank.

FIG. 5 shows a holding tank configured with a magnetic rotating drum situated in a weir. All stock must pass though the narrow channel in which the drum is positioned. The magnetic contaminant becomes attached to the surface of the drum as it rotates through the slurry and is detached and removed outside the slurry.

The following examples describe such treatment, as well as studies of selected variables, such as temperature, pH, and consistency, and provide an evaluation of the combination of flotation and magnetic stickies removal. Also disclosed is the process use of a high gradient magnetic separation technique for magnetic stickies removal on a commercial scale. These examples are provided for purposes of illustration and are not to be construed as limiting the invention.

Example 1

Mixed office wastes (MOW) containing xerographic and laser-printed papers and white pressure-sensitive adhesive labels were mixed in the ratio of 80:20, respecitively. The mixture was repulped and pretreated (agglomerant+ magnetite addition) in a British Disintegrator under conditions described in Table I.

TABLE I

| | | | | Ink/Stickies Removal, % | |
|---|---|---|---|---|---|
| Pulp | Hydrapulping | Pretreatment | Magnetic Treatment, by | visible[1] | TAPPI[2] |
| 80% MOW + 20% adhesive labels | 6% cons., 45° C., 30 min. in British Disintegrator | 5% cons., 2% agglomerant 0.025% magnetite, 0.8% caustic at 65° C., 30 min. in British Disintegrator | Permanent Magnet | 99.7 | 99.4 |
| 80% MOW + 20% adhesive labels | 6% cons., 45° C., 30 min. in British Disintegrator | 5% cons., 2% agglomerant 0.025% magnetite, 0.8% caustic at 65° C., 30 min. in British Disintegrator | HGMS[3] | 99.8 | 99.6 |

[1]percent reduction in ink particles >40 microns in diameter
[2]percent reduction in ink particles >220 microns in diameter
[3]high gradient magnetic separator The adhesive that was on the white labels separated out in small globular form during the repulpinng and pretreatment phase. Visual examination of the sticky globules showed substantial amounts of ink particles attached onto the surface as well as inside of the globules. Magnetic separation provided effective removal of the ink-magnetite-stickies agglomerates that were formed during the repulping/ pretreatment phases. The resulting dean pulp slurry was made into handsheets for ink analysis. As noted in Table I, the invention process produced efficient contaminant (both ink and stickies) removal.

Example 2

To illustrate that stickies removal by magnetic treatment is not dependent on the presence of ink contaminants, white pressure-sensitive adhesive labels were added to ink-free recovered papers to provide a stickies content of about 6,000 ppm. The resulting blend was treated with 0.5% agglomerant, 0.75% magnetite, and 1.0% polystyrene acrylate type polymer under sustained agitation for 30 minutes at 75° C. After the treatment, the pulp was diluted to 0.5% consistency, and the diluted pulp was subjected to magnetic separation. It was clear from visual observance that near complete removal of stickies was obtained.

As will be appreciated by those skilled in the art, the present invention may be embodied in other specific forms without departing from the spirit or essential attributes thereof; and, accordingly, reference should be made to the appended claims, rather than to the foregoing specification, as indicating the scope of the invention.

What is claimed is:

1. A process for removing stickies from repulped waste paper stocks including stickies-contaminated papers comprising introducing a magnetic carrier material selected from the group consisting of ferromagnetic and paramagnetic materials to the stocks to form attachments between particles of the stickies and the magnetic carrier material, followed by addition of an agglomeration agent prior to magnetic separation of the agglomerated magnetic carrier material and attached stickies from the stocks, wherein the agglomeration agent is selected from surfactants or blends of surfactants characterized by HBL values of 10 or lower and by molecules which exhibit a long hydrophilic "tail" and a cloud point of above 65° C.

2. The process of claim 1 wherein the stickies-contaminants are derived from the group of stickies-contaminants consisting of hot-melt adhesives, pressure-sensitive adhesives, and lattices.

3. The process of claim 1 further comprising aiding attachment formation by a treatment selected from the group consisiting of flocculation and coagulation employed after magnetic carrier material and agglomeration agent addition and prior to magnetic separation.

4. The process of claim 3 conducted at from about 25° to 65° C., at a pH of from about 7.0 to about 11.0, and at a consistency of from about 0.3 to 2.0%.

5. The process of claim 3 further comprising an additional treatment step selected from the group consisting of screening, flotation, centrifugal cleaning, washing and sedimentation/decantation, or a combination thereof following the magnetic separation.

6. The process of claim 5 wherein the additional treatment step is flotation.

7. The process of claim 1 wherein the magnetic carrier material is selected from the group of ferromagnetic and paramagnetic materials.

8. The process of claim 7 wherein the magnetic carrier material is magnetite.

9. The process of claim 1 conducted at ambient or higher temperatures, at pulp consistencies up to 4.0%, and at neutral to alkaline pH.

10. The process of claim 1 wherein the magnetic separation is conducted using a high gradient magnetic separator.

11. The process of claim 1 wherein the magnetic separation is conducted using a permanent magnet.

12. The process of claim 1 wherein the magnetic separation is conducted using an electromagnet.

13. The process of claim 1 wherein the process includes employment of a conical forward cleaner and the magnetic separation is employed in conjunction with the forward cleaner in the form of a magnetic flux source positioned immediately external to the cleaner.

* * * * *